United States Patent
Chandler et al.

[15] 3,658,632
[45] Apr. 25, 1972

[54] ADHESIVE STRIPS

[72] Inventors: Edmond A. Chandler, Winchester; Ralph E. Pearsall, Gloucester; Kenelm W. Winslow, Chestnut Hill; Walter W. Yarrison, Beverly, all of Mass.

[73] Assignee: USM Corporation, Boston, Mass.

[22] Filed: June 1, 1970

[21] Appl. No.: 42,164

Related U.S. Application Data

[63] Continuation-in-part of Ser. No. 704,680, Feb. 12, 1968, Pat. No. 3,522,343.

[52] U.S. Cl. ...............................161/150, 161/170, 161/149
[51] Int. Cl. .........................................................D04h 1/04
[58] Field of Search.....................161/50, 156, 149, 168, 150, 161/157, 78, 79, 84, 85, 140, 141, 169, 170

[56] References Cited

UNITED STATES PATENTS

| | | | |
|---|---|---|---|
| 2,543,101 | 2/1951 | Francis | 161/85 |
| 3,322,606 | 5/1967 | Koller | 161/157 |
| 3,400,038 | 9/1968 | Burgess | 161/50 |
| 3,501,368 | 3/1970 | Schabert et al. | 161/157 |
| 3,515,609 | 6/1970 | Rudloff | 161/156 |

Primary Examiner—Morris Sussman
Attorney—Richard A. Wise, Richard B. Megley and Benjamin C. Pollard

[57] ABSTRACT

An adhesive article for locating solid heat activatable adhesive in a predetermined path including a strip of a readily extensible open network of small cross section elements and a substantially inextensible member is joined to the strip to aid in applying the strip while maintaining uniform density of the thin cross section elements adjacent the substantially inextensible member.

7 Claims, 5 Drawing Figures

Patented April 25, 1972 3,658,632

*Inventors*
Edmond A. Chandler, Ralph E. Pearsall,
Kenelm W. Winslow, Walter W. Yarrison
By their Attorney
Benjamin C. Pollard

ADHESIVE STRIPS

This application is a continuation-in-part of our copending application Ser. No. 704,680, filed Feb. 12, 1968, entitled "Shoemaking By Molding With an Adhesive," now U. S. Pat. No. 3,522,343 which issued July 28, 1970.

FIELD OF THE INVENTION

This invention relates to an adhesive article for laying down solid adhesive on a surface to be bonded.

Adhesives have been applied in solvent liquefied or heat liquefied condition along a bond line in the manufacture of irregularly shaped articles to be joined such as parts of a shoe or parts of articles of clothing. These liquid applied adhesives, however, have presented many difficulties in application such as the time factors either in eliminating solvent or in assembling surfaces before a molten adhesive has solidified. Also, special costly equipment has usually been necessary particularly for application of molten adhesives.

There has been developed heat activatable adhesive article in the form of an open network or web of adhesive filaments. This adhesive article presents many advantages both in ease of application and bond completion and the ability to form strong joints with a minimum of adhesive with resulting flexibility of the joint. An important characteristic of one form of such adhesive article is the ready extensibility of the network which enables the article to conform to curved path while remaining in a plane. However, the factor of extensibility and low weight of adhesive per unit area has created problems in handling the adhesive article particularly for machine application; and, in particular, there has been a tendency in the course of conforming the article to a curved path in a single plane for uneven stretching with resulting maldistribution of the adhesive filaments.

It is an object of the present invention to provide a solid heat activatable adhesive article in the form of a strip of a network of thin cross section elements such as filaments of heat activatable adhesive having improved ability to be laid down with even distribution of the elements.

To this end and in accordance with a feature of the present invention, there is provided a strip of a readily extensible network of small cross section elements of heat activatable polymeric adhesive with a substantially inextensible member joined to the strip to aid in uniform application of the adhesive.

BRIEF DESCRIPTION OF THE DRAWING

The invention will be described in conjunction with the accompanying drawing forming part of the disclosure.

In the drawings.

PREFERRED EMBODIMENTS

Figure 1:
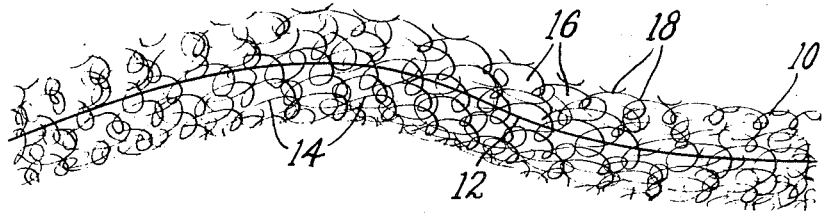
FIG. 1 is a top view of an adhesive strip including an inextensible member in accordance with the present invention showing the maintenance of uniform distribution of the elements of the adhesive strip when the strip is laid down along a curved, planar path.

The adhesive article of the present invention includes an extensible adhesive strip 10 and a substantially inextensible member, for example, a flexible strand 12 (see FIG. 1) joined to the strip. The preferred adhesive strip material is formed of a network of small cross section elements 14 such as fine fibers or filaments of thermoplastic adhesive material with substantial open spaces 16 between the elements. The fibers or filaments may be in woven or nonwoven relationship. Woven adhesive elements may be cut on the bias to allow extensibility. A particularly satisfactory material is made up of fibers laid down in crossing relation with the fibers joined to each other at points 18 of intersection to form an integral sheet capable of being handled. The sheet may be formed by melting and extruding a thermoplastic adhesive material from a plurality of spinnerettes to form filaments which are deposited on a moving carrier in crossing relation. The deposited filaments bond together at points 18 of intersection, i.e. the crossing points while in the tacky or partly solidified condition. The rate of extrusion and the speed of the carrier may be correlated to provide any desired weight of sheet material per square yard. The sheet so formed is slit into strips 10 of any desired width. In general, where substantial curvature of the strip in the plane of the strip is required, the width of strip should not be substantially greater than the radius of the curve to which it must conform.

As the adhesive of which the sheet is formed it is preferred to use high molecular weight thermoplastic synthetic polymer resins, for example, relatively high molecular weight polyesters, polyamides, polyesteramides and thermoplastic polyester glycol urethanes or polyether glycol urethanes. Other normally solid heat softenable resinous materials capable of melting to a condition for wetting and adhering to surfaces to be bonded and of hardening to provide a strong bond may be used.

The substantially inextensible flexible member 12 joined to the adhesive strip 10 preferably extends generally lengthwise of the strip and may be located either in central portions, (see FIG. 1) or at an edge (see FIG. 2) of the strip 10. The member may be a heat softenable strand suitably of the same material as the adhesive but, preferably, of greater cross section than the elements making up the strip or may be a substantially infusible strand or sheet, for example, a sheet of paper or a thread or a filament of cotton or other natural fiber or of a high melting resin which does not soften or melt at the activation temperature of the adhesive.

Inextensible flexible elements 12 of heat softenable material, e.g. the same adhesive as used to form the strip 10, may be joined to the strip by extruding a strand of molten material onto the strip in a desired location or by laying down a strand of the heat softenable material on the strip of adhesive and joining it, for example, by heat and pressure.

Figure 2:
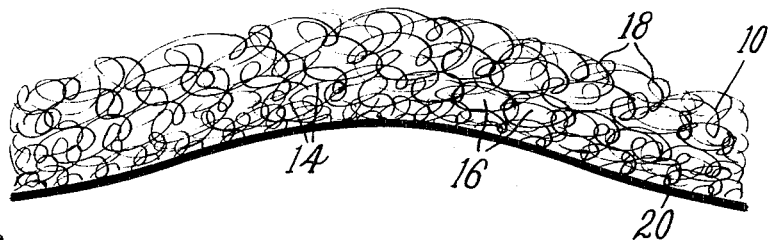
FIG. 2 is a top view of a second form of the adhesive strip of the present invention including an inextensible member formed from the adhesive of the strip.

Particularly where the inextensible member is to be at an edge of the strip 10, localized heat may be applied to the edge of the strip to cause portions of the elements 14 making up the strip to melt and retract to form a thickened substantially inextensible beading 20 of material from the melted and retracted elements (see FIG. 2). One way of achieving this last action is to bring a heated surface in contact with edge portions of a strip or to use a heated blade to divide a sheet of the adhesive into strips.

Figure 3:
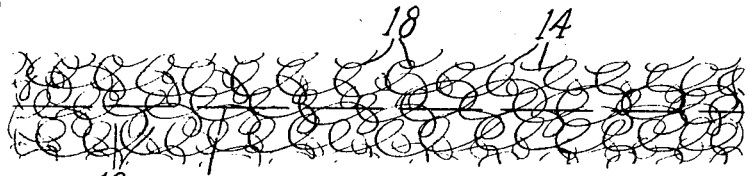
FIG. 3 is a top view of a third form of the adhesive strip of the present invention including a mechanically joined inextensible member.

Substantially infusible non-extensible flexible reinforcing members may be joined to the adhesive strip with the aid of heat and pressure to activate the adhesive of the strip sufficiently to join it to the inextensible member. It is also possible to effect a mechanical union of the strip with the inextensible member. Where the network of adhesive elements is sufficiently strong, the inextensible member may be a row of stitching 22, (see FIG. 3) preferably relatively long stitch lengths extending lengthwise of the adhesive strip 10.

When the inextensible member is at edge portions, the extensibility of the portions of the strip farthest from the inextensible member must be greater than where the member is centrally disposed in order to withstand a given curvature without disruption of the uniform distribution of the adhesive elements making up the strip. However, arrangement of the inextensible member at the edge of the strip is of advantage, for example, in use of the adhesive strip to bond a shoe sole to a shoe upper.

Figure 5:
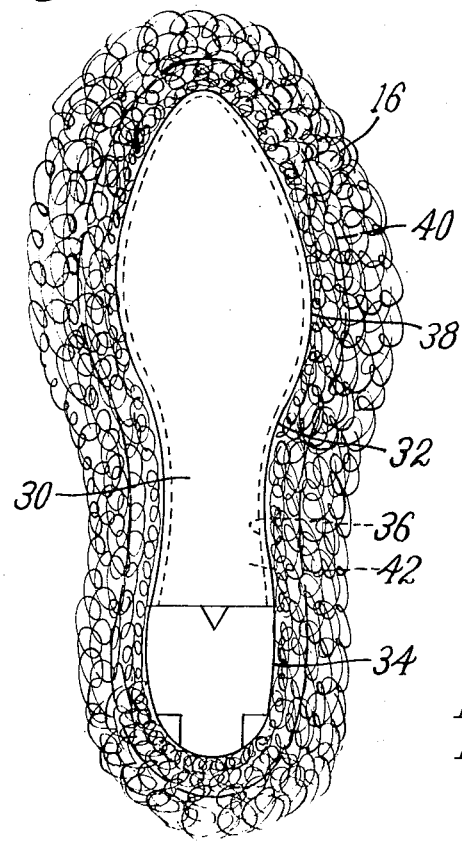
FIG. 5 is a bottom view of a cement lasted shoe upper on a last with an adhesive unit including an inextensible sheet disposed on the bottom of the shoe.
Figure 4:
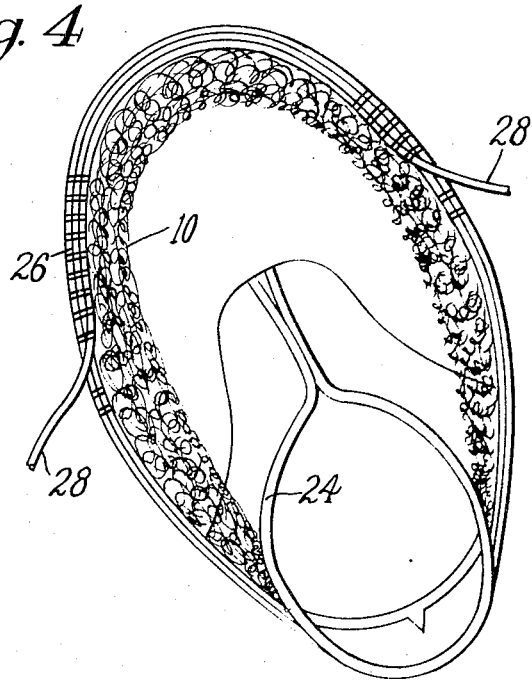
FIG. 4 is a plan view on a reduced scale of an unlasted shoe upper of the string lasted type showing an adhesive strip secured to the shoe upper.

As described in the parent application, a strip of adhesive 10 comprising a network of adhesive fibers with an inextensible member secured to an edge may be secured in position to cover the attaching margin of a lasted shoe upper (see FIGS. 4 and 5). For joining an adhesive strip 10 to a shoe 24 of the string lasted type, the strip 10 may be stitched in place by the stitching 26 through which the lasting string 28 extends as shown in FIG. 4. The adhesive fiber network can compress or extend in the plane of the strip because of its open construction so that when the shoe 24 is placed on a last and lasted by tightening the lasting string 28 the strip 10 will compress or extend in the plane of the strip to remain flat and does not interfere with the lasting operation.

In another embodiment of the article of the present invention (see FIG. 5), there may be provided a sheet 30 of flexible inextensible material such as paper cut to an outline such that a strip 10 of the adhesive sheet material secured to its margins 32 follows a predetermined bond line. Thus, as shown in the drawing a piece of paper 30 cut to a shape so that it can be placed on the bottom of a lasted shoe upper 34 with the edges 32 of the paper extending past the inner edges 36 of the lasted over portion of the shoe upper but spaced well within the outer edges 38 of the attaching margins 40 of the shoe upper, has a strip 10 of the adhesive sheet material secured to its edges with portions of the strip 10 extending outwardly to cover the attaching margins 40 of the shoe upper. This article is of particular advantage in shoe construction in which a sole is injection molded onto a shoe upper by placing the upper against a mold and introducing molten resinous material such as hot plasticized polyvinyl chloride sole forming material into the space between the bottom of the shoe upper and the mold surface. The paper 30 serves to close off the joints between the shoe insole 42 and the inner edges 36 of the attaching margins 40 of the shoe upper. Also, the paper 30 serves as a substantially inextensible reinforcement which makes it easier to locate and hold the strip 10 of adhesive sheet on the bottom of the shoe upper.

The following examples are given as of assistance in understanding the invention. It is to be understood that the invention is not limited to the particular procedures, materials or conditions employed in the examples.

EXAMPLE I

A crystallizable copolyester from condensation and polymerization of a 5.0:4.1:0.9 mol ratio mixture of terephthalic acid, isophthalic acid and dibutyl sebacate with 1,4 butane diol having a melting point of about 280° F. was melted and extruded from a plurality of spinnerettes as filaments 0.003 to 0.005 inch in diameter. The filaments were deposited on a moving carrier in crossing relationship to form a web with the filaments adhered to each other at crossing points. The rate of extrusion and the speed of the carrier were correlated so that the web had a weight per square yard of about 60 grams. On cooling, the web was slit to form strips of about 1 inch in width. A heated blade wiped along an edge of a strip caused the filaments adjacent that edge to melt and retract to form a bead.

The strip of resin fiber web was stitched along the lasting margin of a string lasted type canvas shoe upper with the web held in place by the stitching which provided a loop for the lasting string.

The shoe upper was placed on a last and conformed to the shape of the last by tightening the lasting string. At this point the strip of web was spread outwardly to overlie the lasting margin of the shoe upper. The bottom of the shoe upper was subjected to radiant heat at a distance of 2 inches for a period of about 15 seconds which both heated the bottom of the shoe upper and caused the web to wilt into engagement with the bottom of the shoe upper. The shoe upper was then promptly assembled with a sole-forming mold where the engagement between the shoe upper and the edges of the sole mold provided a seal with portions of the web pinched between the shoe upper and the mold edge. Promptly after assembly of the shoe upper, hot, plasticized polyvinyl chloride sole forming material at a temperature of 375° F. was injected into the mold to fill the mold. The material in the mold was allowed to cool for 70 seconds and the mold was then opened. The sole formed on the bottom of the shoe upper adhered strongly.

EXAMPLE II

A center piece was cut from paper to a size and shape to cover the center portion of a shoe bottom with its edges extending just slightly past the inner edge of the lasted over portion of the shoe upper. A 1 inch wide strip of adhesive fiber web similar to that of Example I was adhered along the edges of the center piece to project outwardly from the center piece to form a composite unit for assembly against the bottom of a lasted shoe upper with the edges of the web extending beyond the edges of the shoe upper.

An assembly of leather shoe upper and the adhesive web — center piece composite was subjected to radiant heat at a distance of 2 inches for a period of about 30 seconds which both heated the attaching surfaces of the bottom of the shoe upper and caused the web to wilt into engagement with those attaching surfaces. The shoe upper was then promptly assembled with a sole-forming mold where the engagement between the shoe upper and the edges of the sole mold provided a seal with portions of the web pinched between the shoe upper and the mold edge. Promptly after assembly of the shoe upper, hot, plasticized polyvinyl chloride sole forming material was injected into the mold to fill the mold. The material in the mold was allowed to cool for two minutes and the mold was then opened. The sole formed on the bottom of the shoe upper adhered strongly and was not separable without disrupting the shoe upper material.

Having thus described our invention what we claim as new and desire to secure by Letters Patent of the United States is:

1. As an article of manufacture for use in locating adhesive in a predetermined path, a sheet of narrow width of a readily extensible open network of thin cross section filaments of heat activatable polymeric adhesive laid down in crossing relation and self-bonded to contacting filaments at crossing points with substantial open spaces between the filaments between said crossing points, and a substantially inextensible member joined to a surface of said sheet restricted to a line with the joint line in substantially uniform relation to a lengthwise edge of said sheet whereby said sheet may be laid flat along a path which curves in the plane of said sheet by stretching or compressing the strip in portions spaced from said reinforcement while a desirable uniform density of said thin cross section adhesive filaments is maintained in portions of said sheet adjacent said reinforcement.

2. An article of manufacture as defined in claim 1 in which said inextensible member is a flexible strand of heat activatable polymeric adhesive of greater cross section than said filaments.

3. An article of manufacture as defined in claim 1 in which said substantially inextensible member extends along an edge of said sheet.

4. An article of manufacture as defined in claim 3 in which said member is a flexible bead of adhesive of greater cross section than said filaments and formed from fused and retracted thin cross section filaments of said sheet.

5. An article of manufacture as defined in claim 3 in which said substantially inextensible member is an infusible sheet material.

6. An article of manufacture as defined in claim 5 in which said substantially inextensible member is paper.

7. An article of manufacture as defined in claim 1 in which said inextensible member is a row of stitching through said network of adhesive filaments extending lengthwise of the sheet.

* * * * *